(12) United States Patent
Goertz

(10) Patent No.: US 6,254,655 B1
(45) Date of Patent: Jul. 3, 2001

(54) PROCESSES FOR PREPARING GRANULAR COMPOSITE FERTILIZER COMPOSITIONS AND PRODUCTS PRODUCED THEREBY

(75) Inventor: Harvey M. Goertz, Marysville, OH (US)

(73) Assignee: OMS Investments, Inc., Wilmington, DE (US)

( * ) Notice: Subject to any disclaimer, the term of this patent is extended or adjusted under 35 U.S.C. 154(b) by 0 days.

(21) Appl. No.: 09/272,025

(22) Filed: Mar. 18, 1999

(51) Int. Cl.⁷ .................................................. C05C 9/02
(52) U.S. Cl. .............................. 71/28; 71/64.03; 71/64.11
(58) Field of Search .................................... 71/28, 29, 30, 71/64.11, 903, 904, 1, 11, 27, 64.01, 64.03, 31, 32, 33, 34, 54, 58, 61, 62

(56) References Cited

U.S. PATENT DOCUMENTS

| | | |
|---|---|---|
| 3,076,700 | 2/1963 | Renner . |
| 3,198,761 | 8/1965 | O'Donnell . |
| 3,677,736 | 7/1972 | Formaini . |
| 3,705,794 | 12/1972 | Czurak et al. . |
| 3,989,470 | 11/1976 | Czurak et al. . |
| 4,025,329 | 5/1977 | Goertz . |
| 4,089,899 | 5/1978 | Greidinger et al. . |
| 4,378,238 | 3/1983 | Goertz . |
| 4,411,683 | 10/1983 | Goertz . |
| 4,610,715 | 9/1986 | Monaldi et al. . |
| 5,102,440 | 4/1992 | Gallant et al. . |
| 5,266,097 | * 11/1993 | Moore ....................................... 71/28 |
| 5,851,261 | * 12/1998 | Markusch et al. .................. 71/64.07 |

OTHER PUBLICATIONS

"Reactions of Molten Urea with Folmaldehyde"; Thomas P. Murray, 1985 American Chemical Society, pp. 420–425.

* cited by examiner

*Primary Examiner*—Wayne Langel
*Assistant Examiner*—Eileen E. Nave
(74) *Attorney, Agent, or Firm*—Jones, Day, Reavis & Pogue

(57) ABSTRACT

Granular composite fertilizer compositions are prepared by applying a liquid mixture of urea and formaldehyde to a dry substrate such as a phosphorus source, a potassium source, a secondary nutrient source, a micronutrient source or mixtures thereof and reacting the liquid mixture in situ to form methylene urea reaction products which promote binding of the substrate into a granular composite while granulating the substrate at the same time that the liquid mixture reacts in order to form the granular composite fertilizer compositions.

33 Claims, No Drawings

PROCESSES FOR PREPARING GRANULAR COMPOSITE FERTILIZER COMPOSITIONS AND PRODUCTS PRODUCED THEREBY

BACKGROUND OF THE INVENTION

1. Field of the Invention

This invention relates to processes for producing granular composite fertilizer compositions and to the products produced by such processes. More particularly, it relates to processes for producing granular composite fertilizer compositions including nitrogen sources in combination with phosphorus sources and/or potassium sources and/or secondary nutrient sources and/or micronutrient sources and/or mixtures thereof employing a single reaction/granulation step to produce the granular composite fertilizer compositions from liquid mixtures of urea and formaldehyde. The invention further relates to the granular compositions prepared by such processes.

2. Description of Related Art

Urea formaldehyde condensation products containing methylene urea polymers of varying chain length have been widely used heretofore as controlled or slow release nitrogen fertilizers. Additionally, a variety of processes for producing controlled or slow release fertilizer compositions are known and, particularly, processes for producing controlled or slow release reaction products of urea and formaldehyde for fertilizer applications. Traditionally, controlled or slow release urea-formaldehyde reaction products for fertilizer applications have been prepared in order to achieve the proper degree of polymerization required to provide the desired fertilizer characteristics.

Normally, these products have been prepared by first reacting urea and formaldehyde at elevated temperatures in an alkaline solution to produce methylol ureas. The reaction mixtures have then been acidified causing the methylol ureas to polymerize to form methylene urea polymers of varying chain length. Then, in order to produce NPK composite granular fertilizers, further processing steps usually have been required after the reaction step such as formulating additional ingredients with the reacted components and/or granulating the resulting products in a separate granulation step to produce composite granular end products.

For example, U.S. Pat. No. 4,089,899 discloses what is there described as a controlled reaction system for preparing slow release ureaform compounds with a low average degree of polymerization. The process disclosed therein involves the reaction of urea and formaldehyde in the presence of an acid catalyst for extended reaction times at low temperatures in order to produce nitrogen only fertilizer compositions having nitrogen content greater than 41% (by weight). For the processes of this patent to produce composite compositions, time consuming and expensive multiple step processing of the raw materials would be required which would be commercially disadvantageous.

U.S. Pat. No. 3,198,761 discloses processes for producing products by reacting a urea-formaldehyde resin into a solid sheet which is milled and screened to provide a granular product having a desired particle size. These processes are known as the "Nitroform" processes and as described in this patent relate only to the preparation of nitrogen fertilizers and are not directed to the production of composite compositions. Furthermore, as discussed above relative to U.S. Pat. No. 4,089,899, for the processes of this patent to produce composite compositions, the implementation of time consuming and expensive multiple stage processing of the raw materials would be required, rendering the process commercially disadvantageous.

Other known processes for producing granular controlled or slow release fertilizer products are disclosed, for example, in U.S. Pat. Nos. 3,076,700; 3,705,794 and 3,989,470. Essentially, the products described therein are produced by reacting ureaformaldehyde resins into rigid foams which are dried, milled and screened to the desired granular size. As opposed to the technology disclosed in U.S. Pat. No. 3,198,761 which is suitable solely for production of nitrogen only products, the processes disclosed in these patents have the flexibility of producing composite fertilizers by slurrying other finely ground additives such as phosphorus and/or potassium salts into the resin prior to the foaming reaction.

Thus, the processes disclosed in U.S. Pat. Nos. 3,076,700; 3,705,794 and 3,989,470 represent an advancement in respect to their ability to produce a wide variety of N-P-K minor element ratios in the products and are not restricted to the production of nitrogen only products. However, these processes are restricted in the range of N-P-K ratios in view of the limit on the amount of solids which can be slurried into the ureaformaldehyde resin without adversely impacting the condensation reaction. Furthermore, the products produced in accordance with the disclosures of U.S. Pat. Nos. 3,076,700; 3,705,974 and 3,989,470 have been found to be quite friable or fragile and susceptible to being dusty as a result of handling, bagging and the like. Also, these products have a very broad particle size distribution resulting in a low Uniformity Index (low UI).

U.S. Pat. No. 3,677,736 discloses a multi-stage process for producing a liquid fertilizer suspension of ureaform. Broadly, the process involves the reaction of urea and formaldehyde in the presence of ammonia at an alkaline pH followed by acidification. The final product is stated to be a liquid fertilizer rather than a granular composite fertilizer composition.

U.S. Pat. No. 4,025,329 discloses another process for producing carrierless products. In this process a granular product is formed, for example, in accordance with the disclosures in U.S. Pat. Nos. 3,705,794 and 3,989,470 and then the granules are compacted with other nutrient or pesticide additives to produce a product of uniform composition and particle size. The density of the granules produced is greater than 1.4 and the granular size is greater then 30 mesh, with substantially all of the granules having a ratio of largest to smallest granule of less than 3:1. Again, the production of composite fertilizers employing the techniques described in this patent require economically disadvantageous two step processes and the products produced would be angular in nature resulting in abrasion to fines particles and dust generation during handling. For example, the products present a dust plume problem when poured from their storage container. This dust plume results from abrasion of the angular edges of the product particles during handling and from surface adhesion of dust to the product during the manufacturing process. Additionally, these high density products have been found to present a dispersibility problem in regard to their use on turf. In this regard, the particles size of these products is too large and the products do not disperse adequately to penetrate the turf canopy after application. Thus, the product remains on the surface to be picked up on shoes, golf balls and the like as they travel over the turf A further experimental multi-stage process for producing ureaform fertilizer products is disclosed in an article entitled "Reactions of Molten Urea with Formaldehyde", by Thomas P. Murray et. al., published in *Ind. Eng. Chem. Prod. Res. Dev.*, 1985, at 420–425. The process disclosed therein entails the reaction of molten urea with paraformaldehyde either by mixing paraformaldehyde into melted urea at temperatures of between 130 degrees and 140 degrees C. or by premixing the paraformaldehyde with the urea and heating the solid mixture to 130 degrees C. with stirring. Thereafter, the molten reaction mixture resulting from either of the procedures is cooled to form a solid sheet and the sheet is ground in a second step to form granular fertilizer products.

U.S. Pat. Nos. 4,378,238 and 4,411,683 disclose processes for producing slow release granular products having at least 60% of the polymeric nitrogen in the form of methylene diurea (MDU) and dimethylene triurea (DMTU). The processes disclosed therein for producing fertilizer products includes the step of reacting aqueous mixtures of urea, formaldehyde and ammonia at elevated temperatures to produce methylol ureas. Then, phosphorus and/or potassium sources are slurried into the aqueous mixture and acid is added directly to the reaction mixture. The acidified mixture is reacted to form a foamed condensation reaction products which are dried and milled into final products. In regard to the process disclosed in U.S. Pat. Nos. 4,378,238 and 4,411,683, it has been found that the process therein cannot be economically or feasibly conducted to produce commercially acceptable products which do not employ an absorbent carrier capable of absorbing liquids to provide a granular structure to the final product. Typical examples of commonly used carriers which are not required for use in forming products of the present invention are vermiculite, perlite and corncobs. Furthermore, as described hereinafter, the process of the present invention does not employ ammonia in a liquid reaction mixture as was described in the processes disclosed in U.S. Pat. Nos. 4,378,238 and 4,411,683 since it was found that the inclusion of ammonia in the aqueous reaction mixture contributed to the above described problems with these prior art processes. Still further, it should be noted that the process of the present invention, as described herein, does not require the use of absorbent carrier materials to provide granular structures.

U.S. Pat. No. 5,102,440 discloses a process which comprises preparing a mixture of urea and formaldehyde, heating the reaction mixture until essentially all of the formaldehyde in the mixture is fully reacted and a molten or liquid urea-formaldehyde resin is formed. Then, the molten fully reacted,urea-formaldehyde resin is sprayed on small finely divided solid raw material particles and the urea-formaldehyde resin acts as a binder to agglomerate the solid particles within a matrix formed by the urea-formaldehyde resin in order to produce a granular product of a desired size. The resulting product is allowed to cool and solidify into a hard granular carrierless product which exhibits slow release nitrogen properties. The products prepared in accordance with the teachings of this patent have been found to exhibit highly desirable functional characteristics. However, as a result of the two step process disclosed in that patent, products cannot be produced having nitrogen distribution levels characterized by low urea content and significantly higher polymeric nitrogen content as is produced by the process of the present invention which enables production of products including 40% or less urea content (preferably, less than 30% and, most preferably, less than 20%) and at least 50% polymeric nitrogen content (preferably, greater than 60% and, most preferably, greater than 80%).

Furthermore, the processes disclosed in U.S. Pat. No. 5,102,440 do not offer as much flexibility in producing variable size granules, particularly with regard to smaller particle sizes and do not offer the uniformity of particle size (UI) as do the products produced by the processes of the present invention.

Accordingly, none of the prior processes are suitable for producing controlled or slow release fertilizer compositions having the desired characteristics either because of process or product shortcomings such as the cost effectiveness of the process, the ability to include additive products in the urea-formaldehyde reaction product and the physical properties of the product produced by those prior art processes.

SUMMARY OF THE INVENTION

It is a primary object of the present invention to provide cost effective processes for producing composite controlled or slow release fertilizer compositions containing nitrogen in combination with at least one material selected from the group consisting of a phosphorus source, a potassium source, a secondary nutrient source, a micronutrient source and mixtures thereof.

Another object is to provide processes for producing homogeneous granular composite fertilizer compositions having desired physical and chemical properties, for example, in regard to the amount of polymeric nitrogen in the product; the chain length of nitrogen polymers in the product; nitrogen release patterns provided in use of the products; low surge and low burn nature of the products; control of particle size and uniformity; and performance consistency characteristics of the products.

A more specific object of this invention is to provide a process for producing controlled or slow release composite fertilizer compositions by the in-situ reaction of a liquid mixture of urea and formaldehyde applied to at least one dry ingredient selected from the group consisting of a phosphorus source, a potassium source, a secondary nutrient source, a micronutrient source and mixtures thereof while simultaneously granulating the dry ingredient to produce granular composite fertilizer compositions.

It is an additional specific object of this invention to provide a process for producing controlled or slow release fertilizer compositions having nitrogen distribution levels characterized by low urea content and significantly higher polymeric nitrogen content and, more particularly, to fertilizer compositions which include 40% or less (by weight urea content (preferably, less than 30% by weight and, most preferably, less than 20% by weight) and at least 40% (by weight) polymeric nitrogen content (preferably, greater than 50% by weight and, most preferably, greater than 70% by weight).

The foregoing and other objects of this invention are achieved by processes which comprise providing liquid mixtures of urea and formaldehyde and applying such liquid mixtures to dry substrates such as the non-absorbent phosphorus sources and/or potassium sources and/or secondary nutrient sources and/or micronutrient sources and/or mixtures thereof described hereinafter. Then, after the liquid mixtures are applied to the substrates, the liquid mixtures are reacted in situ to form methylene urea reaction products while the substrates are simultaneously being granulated. The methylene urea reaction products produced in this single stage reaction/granulation step of the processes of this invention act as binders to promote the production of composite granular compositions from the dry substrates.

The resulting granular compositions prepared by the processes of this invention are homogeneous composite fertilizer compositions which may be further processed as by standard techniques including drying, screening, cooling and the like to achieve finished hard, dry, essentially non-friable composite fertilizer compositions containing methylene urea nitrogen sources in combination with phosphorus, potassium, secondary nutrient and/or micronutrient sources.

The products produced by the processes of the present invention have been found to exhibit a variety of significantly improved functional characteristics relative to prior methylene urea based fertilizer compositions. Also, the products have been found to have unique chemical analyses including nitrogen distribution levels characterized by low urea content and significantly higher polymeric nitrogen content as compared with prior art composite fertilizers. More particularly, the fertilizer compositions produced in accordance with this invention include 40% or less (by weight) urea content (preferably, less than 30% by weight and, most preferably, less than 20% by weight) and at least 40% (by weight) polymeric nitrogen content (preferably, greater than 50% by weight and, most preferably, greater than 70% by weight).

DETAILED DESCRIPTION

In the process of this invention a liquid mixture is prepared by mixing urea and a formaldehyde source, preferably at a pH of about 7.0–10.0 and at a temperature of about 60–85° C. to form a liquid reaction mixture. Typical sources of formaldehyde are "urea formaldehyde concentrate" compositions. "Urea formaldehyde concentrate" compositions for use in the present processes are precondensed solutions of formaldehyde and urea containing substantial amounts of free formaldehyde and dimethylol ureas. The molar ratio of urea to formaldehyde for use in preparing the liquid reaction mixture ranges from about 1.2 to about 3.5 depending on the desired methylene urea chain length and the level of slow release nitrogen desired in the final product. The resulting reaction liquid is then introduced into a mechanically agitated device, preferably in a low shear apparatus such as a rotating granulation drum, along with dry substrate ingredients necessary for producing granular composite fertilizer compositions under the low shear conditions in the granulation device. The dry substrates include phosphorus, potassium, secondary nutrient and/or micronutrient sources. In addition, an acid such as concentrated sulfuric acid, hydrochloric acid, nitric acid, phosphoric acid and the like is introduced into the mechanically agitated device (e.g., the rotating drum granulator) to catalyze an in-situ reaction of the liquid reaction mixture to form methylene urea reaction products which promote binding of the substrate ingredients into granular composites. This in-situ reaction of the liquid mixture occurs simultaneously with the granulation of the substrate to form a granular composite fertilizer composition.

Suitable dry ingredients for reaction with the methylene urea nitrogen source include such phosphorus sources as single superphosphates, triple superphosphates, calcium phosphates, nitrophosphates, potassium phosphates, ammonium phosphates, ammoniated superphosphates and the like and mixtures thereof The ammonium phosphates may be introduced in-situ from the ammoniation of liquid phosphoric acid. Suitable potassium sources for use in the processes of this invention include muriate of potash, potassium sulfates, potassium phosphates, potassium hydroxides, potassium nitrates, potassium carbonates and bicarbonates, potassium magnesium sulfates and the like and mixtures thereof. Suitable secondary nutrient sources for use herein include elemental sulfur, calcium and magnesium salts such as phosphates, oxides, sulfates, carbonates, chlorides, nitrates and the like and mixtures thereof. Suitable micronutrient sources include iron, manganese, copper, boron, zinc and molybdenum salts such as phosphates, oxides, sulfates, carbonates, chlorides, nitrates, borates, molybdates and the like and mixtures thereof as well as chelates of micronutrients such as EDTA chelates and the like. For example, the following representative materials may be used as dry micronutrient sources in the process of the present invention: calcium nitrate, magnesium sulfate, magnesium nitrate, ferrous sulfate, ferrous nitrate, manganese sulfate, manganese nitrate, copper sulfate, copper nitrate, boric acid, sodium borate, zinc sulfate, zinc nitrate, sodium molybdate, ammonium molybdate and the like.

In the present process, a homogenous composite fertilizer composition containing nitrogen with a phosphorus source and/or a potassium source and/or a secondary nutrient source and/or a micronutrient source prepared by the in-situ one step reaction/granulation in a mechanically agitated device such as a rotating drum granulator usually is removed from the device in the form of a wet composite having a qualitatively wet appearance at a temperature of about 35–75° C. and a pH of about 3.0–5.0 and this wet composite is introduced into a rotary dryer to convert the wet sand-like composite particulate product into a dry granular product. After the granular product is removed from the dryer, it is screened to separate out "oversize" granules and "fines". The "oversize" granules are milled in a secondary milling operation to reduce the granule size and are re-granulated. The "fines" or undersized granules are recycled directly back into the rotating granulation drum for further reaction as a dry ingredient in the drum. The resulting screened "on-size" granular nitrogen containing fertilizer products are ready for packaging and distribution. These granular products have been found to be of uniform granular size and to be homogeneous in chemical composition.

The process of the present invention is intended to produce products which have unique and distinctive physical characteristics and functionality as compared with prior fertilizer products. Specifically, the products are homogeneous compositions providing maximum uniform nutrient distribution. The particle sizes expressed in terms of Size Guide Numbers (SGN) are controlled (i.e., in the range of about 70 to 280) and as expressed in terms of Uniformity Index (UI) are more uniform and more consistently sized than prior products.

The term Size Guide Number (SGN) as employed herein is the calculated diameter of the "average particle" expressed in millimeters to the second decimal and then multiplied by 100. More precisely, SGN is that particle size which divides the mass of all particles in two equal halves, one having all the larger size particles and the other half having all smaller size particles.

In addition, the granular composite compositions produced by the present process have been found to be more free-flowing and to exhibit reduced tracking and mower pick-up in comparison with other products. Most significantly, the products produced by the processes of the present invention have demonstrated less surge growth and burn potential when applied to turf as compared with prior fertilizer products and are more consistent in rotary or drop spreader applications to turf.

The compositions produced employing the processes of the present invention are essentially a matter of choice among a wide variety of solid raw materials including sources of primary secondary and minor element plant nutrients, pesticides, adjuvants or other desirable additives such as fillers. Thus, the present process provides a virtually limitless potential for producing suitable granular products having a wide range of N-P-K ratios by incorporating phosphorus and/or potassium nutrients therein, for example, as particulate $P_2O_5$ or $K_2O$ sources and, if desired, including a wide diversity of other plant nutrients, micronutrients, pesticides and other additives and adjuvants.

The following examples are specific illustrations of the practice of the invention in accordance with the foregoing process. All parts and percentages are by weight unless otherwise indicated.

EXAMPLE 1

A liquid reaction mixture of 1837 Kg of urea; and 1134 Kg of a urea formaldehyde concentrate (UFC-63, a precondensed solution of formaldehyde and urea containing substantial amounts of free formaldehyde and dimethylol ureas, supplied by Blagden Chemicals Ltd. was introduced into a 3,000 liter batch reactor. The pH of the liquid mixture in the reactor was adjusted to about 8.0–9.0 by the addition about 30 Kg of 20% concentrated sodium hydroxide and the solution temperature was maintained at about 60–70 C. The water content of the solution was approximately 15 wt % water. The liquid mixture was pumped into a rotating drum granulator (approximately 5.2 feet by 20 feet) at a rate of about 3000 kg per hour. The drum granulator was also fed with the following feedrates of dry substrates: prilled urea— 160 kg pr hour; single superphosphate (SSP)—389 kg/hour; triple superphosphate—213 kg/hr; sulphate of potash—1928 kg/hr; recycle process fines—approximately 14,000 kg/hr. The liquid mixture and 287 kg/hr of 20% concentrated sulfuric acid were sprayed through two separate lines onto the rolling bed of dry substrates in the drum granulator. The sulfuric acid acted as a catalyst to initiate the formation of methylene ureas from the liquid reaction mixture. An additional 500 Kg/hr of steam were added to the drum granulator to help disperse the liquid reaction mixture over the dry substrates. The combination of the reacting liquid and steam caused agglomeration of the dry substrates in the rolling bed of the granulator. The resulting composite fertilizer composition had a qualitatively wet appearance and exited from the drum granulator at a temperature of 75 C. and a pH of 4.2. The wet composite fertilizer composition was introduced into a direct fired rotary drum dryer (approximate 6.5 feet by 60 feet). The product exited at a temperature of 163 degrees F. (73 degrees C.) as a produce a dry granular product. The fines (less than 0.7 mm) were removed from the product by screening and the resultant product was cooled in a rotary drum cooler (approximately 6.5 feet by 45 feet) to a temperature of about 98 degrees F. (31 degrees C.). The cooled product was screened once more over a 1.4 mm screen and a 0.7 mm screen to remove the oversize and fines. The oversize was crushed and was recycled (along with the fines) back to the drum granulator. The "on-size" granules were treated with oil and China clay under standard operating conditions to finalize the production of the homogeneous granular NPK fertilizer products of the present invention for packaging and distribution. The resulting granular composite fertilizer composition had an NPK analysis of 19-3-19 with approximately 76% of its nitrogen derived from polymeric methylene ureas. The urea nitrogen as 24% of the total. The product had a typical SGN of 96 with a UI of 52.

EXAMPLE 2

The following example illustrates the use of the process of Example 1 to produce a granular composite fertilizer containing secondary nutrients (magnesium and sulfur). It also shows the flexibility of the amount of polymeric nitrogen possible with the process of the present invention. The liquid reaction mixture of Example 1 was sprayed at a rate of 2047 kg per hour into the rotary drum granulator of Example 1 onto the following dry substrates: urea—1425 kg/hr; mono ammonium phosphate (MAP)—510 kg/hr; sulphate of potash—847 kg/hr; magnesite—140 kg/hr; magnesium sulphate—1340 kg/hr; recycled product—5500 kg/hr and recycled process fines—10,000 kg/hr. Sulfuric acid (20%) was also sprayed at the rate of 143 kg/hr onto the rolling bed of dry substrates to initiate the methylene urea reaction. The wet composite granulated fertilizer was dried in the rotary drum dryer. The exit temperature was 75 degrees C. The product was cooled to 35 degrees C. and was screened. The final products was treated with oil and clay. The final product NPK analysis was 27-5-8 with 2.6% magnesium (Mg) and 4.6% sulfur (S). Methylene ureas contributed 40% of the nitrogen with urea contributing 24% of the nitrogen. The product had an SGN of about 90 with a UI of about 55.

EXAMPLE 3

The following example illustrates the use of the process of Example 1 to produce a granular composite fertilizer containing micronutrients (iron and manganese). The liquid reaction mixture of Example 1 was sprayed at a rate of 2920 kg per hour into the rotary drum granulator of Example 1 onto the following dry substrates: urea—175 kg/hr; triple superphosphate—336 kg/hr; sulphate of potash—1046 kg/hr; ferrous sulphate—437 kg/hr; manganese sulphate— 161 kg/hr; recycled product—7220 kg/hr and recycled process fines—9200 kg/hr. Sulfuric acid (20%) was also sprayed onto the rolling bed of dry substrates to initiate the methylene urea reaction. Steam was added at the rate of 180 kg/hr. The wet composite granulated fertilizer was dried to 1.5% moisture in the rotary drum dryer. The exit temperature was 74 degrees C. The product was cooled to 32 degrees C. and was screened over 1.2 mm and 2.2 mm screens. The final products was treated with oil and clay. The final product NPK analysis was 22-3-11 with 2% iron (Fe) and 1% manganese (Mn). Methylene ureas contributed 76% of the nitrogen with urea contributing 24% of the nitrogen. The product had an SGN of 135 with a UI of 51.

EXAMPLE 4

This example illustrates the production of a nitrogen composite fertilizer with micronutrient using a mixer/ granulator instead of a drum granulator. A premix of micronutrient powders is prepared by mixing together copper sulfate (13.3 wt %), ferrous sulfate (59.5 wt %), manganese sulfate (12.6 wt %), sodium molybdate (4.4 wt %), and zinc sulfate (9.2 wt %). The micronutrient premix (775 kg) is added to a mechanically agitated mixer where it is sprayed with 248 kg of the liquid reaction mixture of Example 1. Sulfuric acid (20% concentration) is added in the amount of 17.4 kg. The mixture is agitated under low shear at a speed sufficient to prevent agglomeration of large particles. The wet composite mixture is dried in a rotary dryer and subsequently cooled and screened to a 1.2–2.2 mm particle size. The resulting product has 8% nitrogen (17% from urea and 83% from polymeric methylene ureas), 14.2% sulfur, 3.3% copper (Cu), 13.3% iron (Fe), 4.0% manganese (Mn), 2.0% molybdenum (Mo), and 3.2% zinc (Zn). The product has an SGN of about 135 with a UI of about 50.

EXAMPLE 5

This example illustrates the use of liquid phosphate sources as a substitution for dry phosphate substrates when used in combination with other dry substrate sources. The process of Example 1 is fed with the same amount of liquid reaction mixture and dry substrates with the following exception. Instead of using dry single super phosphate and dry triple superphosphate, the phosphorus is supplied by 312 kg/hr of 52% phosphoric acid which is neutralized with 66 kg/hr of anhydrous ammonia. Sand is added as a filler at a rate of 385 kg per hour. The resulting product has the same NPK analysis and physical properties as the product of Example 1

Although the invention has been described in its preferred forms with a certain degree of particularity, it is to be understood that the present disclosure has been made by way of example only. Numerous changes in the details of the compositions and in the operational steps of the methods and in the compositions utilized therein will be apparent without departing from the spirit and scope of the invention, as defined in the appended claims.

The term Uniformity Index (UI) as employed herein is the ratio of the sizes of "small particles" to "large particles" in the product, this ratio being expressed in percentage. More precisely, UI is the ratio, times 100, of the two extreme sizes in the range of particles retained at the 95% level and at the 10% level. A Uniformity Index (UI) of 100 would mean that all the particles have the same size. In a product having a Uniformity Index (UI) of 50, the small particles are half the size of the large particles in the sample.

I claim:

1. A continuous process for producing a granular composite fertilizer composition comprising a nitrogen source in combination with at least one material selected from the group consisting of a phosphorus source, a potassium source, a secondary nutrient source, a micronutrient source and mixtures thereof comprising the steps of:

providing a liquid reaction mixture containing no ammonia and consisting essentially of urea and a formaldehyde source;

introducing the liquid reaction mixture into a mixing device along with an essentially non-absorbent dry substrate material selected from the group consisting of a phosphorus source, a potassium source, a secondary nutrient source, a micronutrient source and mixtures thereof whereby the liquid reaction mixture is continuously applied onto an outer surface of the essentially non-absorbent dry substrate material;

reacting the liquid reaction mixture in situ to form methylene urea reaction products which promote binding of the substrate material into a granular composite while simultaneously granulating the substrate material, under low shear conditions as the liquid reaction mixture reacts to form a granular composite fertilizer composition.

2. The process of claim 1 wherein the mixing device is a drum granulator and said liquid reaction mixture is applied to the dry substrate material in said drum granulator.

3. The process of claim 1 wherein said liquid reaction mixture of urea and formaldehyde is prepared by mixing urea and a liquid urea formaldehyde concentrate at a pH of about 7.0–10.0 and at a temperature of about 60–85° C.

4. The process of claim 3 wherein said urea formaldehyde concentrate is a precondensed solution of formaldehyde and urea containing substantial amounts of free formaldehyde and dimethylol ureas.

5. The process of claim 1 wherein said in-situ reaction of said liquid reaction mixture is acid catalysed.

6. The process of claim 1 wherein said phosphorus source is selected from the group consisting of single superphosphates, triple superphosphates, calcium phosphates, nitrophosphates, potassium phosphates, ammonium phosphates, ammoniated superphosphates and mixtures thereof.

7. The process of claim 1 wherein said potassium source is selected from the group consisting of muriate of potash, potassium sulfates, potassium phosphates, potassium hydroxides, potassium nitrates, potassium carbonates and bicarbonates, potassium magnesium sulfates and mixtures thereof.

8. The process of claim 1 wherein said secondary nutrient source is selected from the group consisting of elemental sulfur, calcium and magnesium salts and mixtures thereof.

9. The process of claim 8 wherein said salts are selected from the group consisting of phosphates, oxides, sulfates, carbonates, chlorides, nitrates and mixtures thereof.

10. The process of claim 1 wherein said micronutrient source is selected from the group consisting of salts of iron, manganese, copper, boron, zinc and molybdenum and mixtures thereof.

11. The process of claim 10 wherein said salts are selected from the group consisting of phosphates, oxides, sulfates, carbonates, chlorides, nitrates, borates, molybdates, micronutrient chelates and mixtures thereof.

12. The process of claim 11 wherein said micronutrient chelates are EDTA chelates.

13. The process of claim 1 wherein said granular composite fertilizer composition resulting from simultaneously reacting the liquid reaction mixture in-situ and granulating the substrate material is a wet composite and said wet composite is dried to produce hard, dry, essentially non-friable composite fertilizer particles.

14. The process of claim 13 wherein said hard, dry, essentially non-friable composite fertilizer particles are screened to remove undersized and oversized particles.

15. The process of claim 14 wherein said removed undersized particles are recycled for use as dry substrate material in said simultaneous in-situ reaction and granulation step.

16. The process of claim 14 wherein said removed oversized particles are crushed and recycled as dry substrate material in said simultaneous in-situ reaction and granulation step.

17. A homogeneous, essentially non-friable granular composite fertilizer composition comprising a nitrogen source in combination with at least one material selected from the group consisting of a phosphorus source, a potassium source, a secondary nutrient source, a micronutrient source and mixtures thereof which is produced by a continuous process comprising the steps of:

providing a liquid reaction mixture containing no ammonia and consisting essentially of urea and a formaldehyde source;

introducing the liquid reaction mixture into a mixing device along with an essentially non-absorbent dry substrate material selected from the group consisting of a phosphorus source, a potassium source, a secondary nutrient source, a micronutrient source and mixtures thereof whereby the liquid reaction mixture is continuously applied onto an outer surface of the essentially non-absorbent dry substrate material;

reacting the liquid reaction mixture in situ to form methylene urea reaction products which promote binding of the substrate material into a granular composite while simultaneously granulating the substrate material, under low shear conditions, as the liquid reaction mixture reacts to form a granular composite fertilizer composition.

18. The composition of claim 17 wherein said liquid reaction mixture of urea and formaldehyde is prepared by mixing urea and a liquid urea formaldehyde concentrate at a pH of about 7.0–10.0 and at a temperature of about 60–85° C.

19. The composition of claim 18 wherein said urea formaldehyde concentrate is a precondensed solution of formaldehyde and urea containing substantial amounts of free formaldehyde and dimethylol ureas.

20. The composition of claim 17 wherein said in-situ reaction of said liquid reaction mixture is acid catalysed.

21. The composition of claim 17 wherein said phosphorus source is selected from the group consisting of single superphosphates, triple superphosphates, calcium phosphates, nitrophosphates, potassium phosphates, ammonium phosphates, ammoniated superphosphates and mixtures thereof.

22. The composition of claim 17 wherein said potassium source is selected from the group consisting of muriate of potash, potassium sulfates, potassium phosphates, potassium hydroxides, potassium nitrates, potassium carbonates and bicarbonates, potassium magnesium sulfates and mixtures thereof.

23. The composition of claim 17 wherein said secondary nutrient source is selected from the group consisting of elemental sulfur, calcium and magnesium salts and mixtures thereof.

24. The composition of claim 23 wherein said salts are selected from the group consisting of phosphates, oxides, sulfates, carbonates, chlorides, nitrates and mixtures thereof.

25. The composition of claim 17 wherein said micronutrient source is selected from the group consisting of salts of iron, manganese, copper, boron, zinc and molybdenum and mixtures thereof.

26. The composition of claim 25 wherein said salts are selected from the group consisting of phosphates, oxides, sulfates, carbonates, chlorides, nitrates, borates, molybdates, micronutrient chelates and mixtures thereof.

27. The composition of claim 17 wherein said granular composite fertilizer composition resulting from simultaneously reacting the liquid reaction mixture in-situ and granulating the substrate material is a wet composite and said wet composite is dried to produce hard, dry, essentially non-friable composite fertilizer particles.

28. The composition of claim 27 wherein said hard, dry, essentially non-friable composite fertilizer particles are screened to remove undersized and oversized particles.

29. The composition of claim 28 wherein said removed undersized particles are recycled as a dry ingredient for said in-situ reaction and granulation step.

30. The composition of claim 28 wherein said removed oversized particles are crushed and recycled as dry ingredients for said in-situ reaction and granulation step.

31. The composition of claim 17 wherein the urea content of the composition is not greater than about 30% (by weight).

32. The composition of claim 17 having nitrogen distribution levels wherein urea content of the composition is not greater than about 30% (by weight) and polymeric nitrogen content is at least 40% (by weight).

33. The composition of claim 32 wherein the polymeric nitrogen content of the composition is at least 50% (by weight).

* * * * *